INVENTORS
W. F. MANNS
L. G. CHEATUM
B. W. GUSTAFSON

INVENTORS
W. F. MANNS
L. G. CHEATUM
B. W. GUSTAFSON

Aug. 18, 1959   W. F. MANNS ET AL   2,900,069
CONVEYOR FEEDER FOR MOBILE ENSILAGE LOADER
Filed May 9, 1957   3 Sheets-Sheet 3

INVENTORS
W. F. MANNS
L. G. CHEATUM
B. W. GUSTAFSON

United States Patent Office 2,900,069
Patented Aug. 18, 1959

2,900,069

CONVEYOR FEEDER FOR MOBILE ENSILAGE LOADER

William F. Manns, Albia, Leo G. Cheatum, and Blaine W. Gustafson, Ottumwa, Iowa, assignors, by mesne assignments, to Deere & Company, a corporation of Delaware Application May 9, 1957, Serial No. 658,193

7 Claims. (Cl. 198—204)

This invention relates to a material-handling apparatus and more particularly to what is known as a feed table for a blower-type elevator.

The invention finds practical utility in the agricultural field in the type of machine in which crops are dumped into a feed table and are thereby transported into the feed inlet of a blower housing which in turn elevates the crops to a place of storage. A typical machine of that nature normally includes the components just named, in addition to which the blower housing is usually provided with wheels whereby the machine may be transported and for that reason requires a draft tongue or other hitch connection for a draft vehicle. It is a principal feature of the present invention to improve the feed table structure by the incorporation therein of a draft tongue which forms the backbone thereof, together with supporting ribs in the form of U-shaped members that embrace the trough. The invention has for a further object the provision of improved means for pivotally mounting the conveyor trough onto the blower housing. Further features reside in improved pivot means, together with improved drive means, and in general the over-all improvement of the structure to the end that a simple, sturdy and economical machine results.

The foregoing and other important objects and desirable features inherent in an encompassed by the invention will become apparent as a preferred embodiment thereof is disclosed in detail in the ensuing specification and accompanying sheets of drawings, the several figures of which will be described immediately below.

Figure 3:
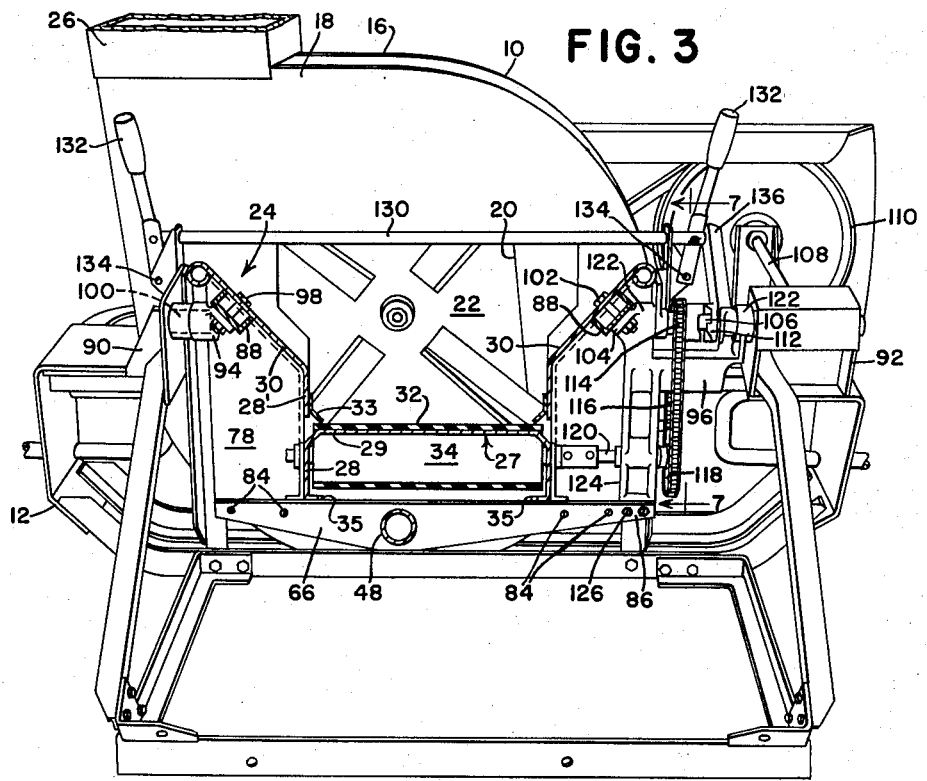
Fig. 3 is an enlarged view, partly in section, as seen along the line 3—3 of Fig. 1.

The basic machine comprises a blower housing 10 mounted on supporting frame structure 12 which in turn carries a pair of retractable wheels 14, the structure in this respect being similar to that forming the subject matter of the U.S. patent to Zollars 2,691,551. As best shown in Fig. 3, the housing 10 has a pair of upright walls or faces 16 and 18, the latter of which has a feed inlet opening 20 through which a blower flywheel is visible at 22. A feed table or trough, indicated in its entirety by the numeral 24, extends horizontally away from the blower housing 10 and is normally operative to feed material lengthwise thereof and into the feed inlet opening 20 for ultimate discharge from the housing 10 via a tangential stack 26.

Figure 4:
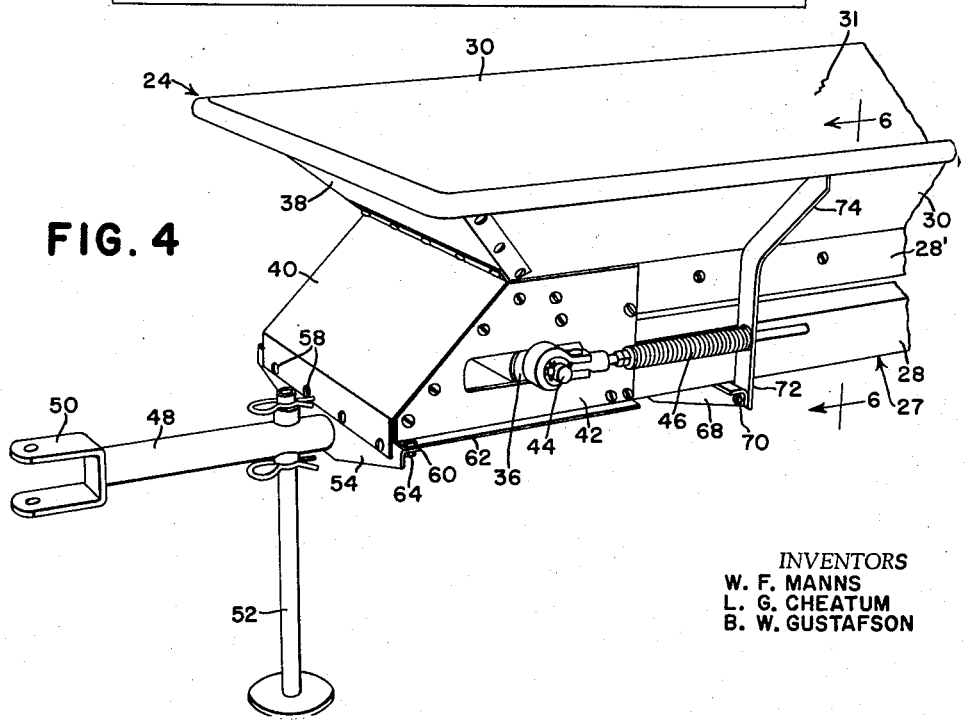
Fig. 4 is an enlarged fragmentary perspective of the hitch end of the machine.
Figure 6:
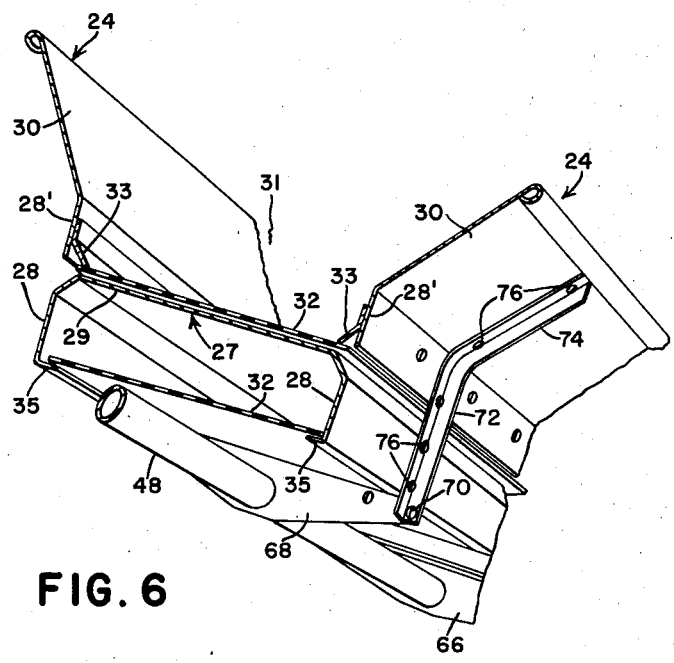
Fig. 6 is a fragmentary perspective of an intermediate portion of the feed table.

The trough is made up of an elongated rigid bottom element 27 of inverted U section having opposite sides 28 and a top 29, together with side extensions 28', each of which is upwardly and outwardly flared at 30 and between which is carried an endless belt-type conveyor 32, mounted on front and rear rollers 34 and 36 (Figs. 3 and 4). The side extensions 28' and flares 30 provide an upper trough section 31 of which the upper run of the belt is a floor. The flared portions 30 are, at the end of the trough remote from the housing 10, joined by an inclined transverse wall 38 which in turn is adjoined by an inclined cover wall 40 that spans a pair of fore-and-aft plates 42 in which the rear roller 36 is mounted by means of a shaft 44 and opposite tensioning devices 46. As best shown in Fig. 6, each side extension carries a stripper 33 that runs along the proximate edge portion of the upper run of the belt and prevents material from escaping through the opening between the associated side 28 and side extension 28'. Each side 28 of the trough bottom 27 is inwardly flanged at 35 to prevent sagging of the lower run of the belt, and the top 29 affords a floor for the upper run of the belt.

Figure 2:
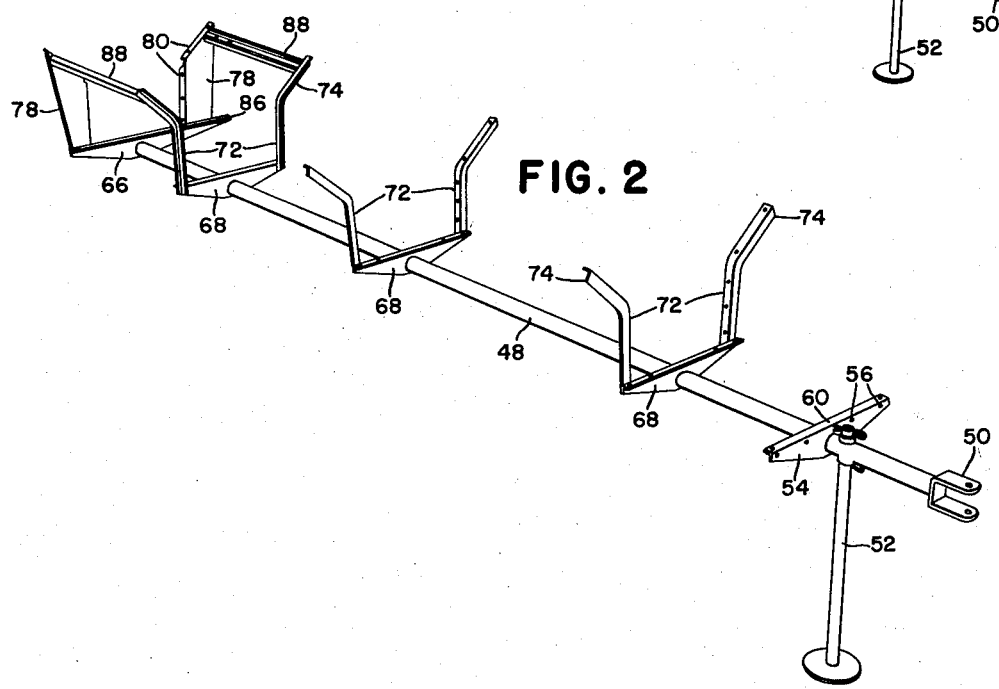
Fig. 2 is a perspective, on an enlarged scale, of the frame or "skeleton" of the trough and draft tongue structure.

The "skeleton" of the structure that forms the backbone of the trough or conveyor 24 is best shown in Fig. 2 as comprising an elongated tubular draft tongue or central support 48 that runs the full length of the trough and which additionally projects at the housing-remote end of the trough to carry a clevis 50 for attachment of the machine to a tractor or similar vehicle whereby it may be transported on its wheels 14. Additionally, the tongue 48 carries near the clevis 50 a retractable support stand 52, which may be of any conventional construction. The tongue 48 rigidly carries, closely adjacent to the support stand 52, a first cross member 54 having therein a plurality of apertures 56 to which the inclined cover plate 40 is secured at its lower edge by means of a plurality of fasteners 58. As best shown in Figs. 2 and 4, the cross member 54 is angular in cross section, affording a flange 60 to which the lower flanges 62 on the plates 42 are rigidly secured as by fasteners 64. The cross member 54 is rigidly secured to the tongue 48 as by welding.

The tongue 48 carries at its opposite end a cross member 66 which is somewhat longer than the cross member 54 and also longer than a plurality of intermediate cross members 68, all of which are connected to the tongue, preferably by welding, and project equidistantly at opposite sides thereof. Each cross member, like the cross member 54, is angular in cross section to afford additional strength and also to afford room for apertures through which appropriate fasteners may be inserted, as will be brought out below. Each cross member 68 has rigidly secured to its outer ends, as by fasteners 70, uprights 72 which connect the trough extensions to the sides of the main trough bottom 27, and these uprights have upwardly and outwardly flared portions 74 to conform to the flares 30 of the trough side extensions 28'. Fasteners 76 secure the uprights to the respective trough sides and also to the flares 30.

Figure 5:
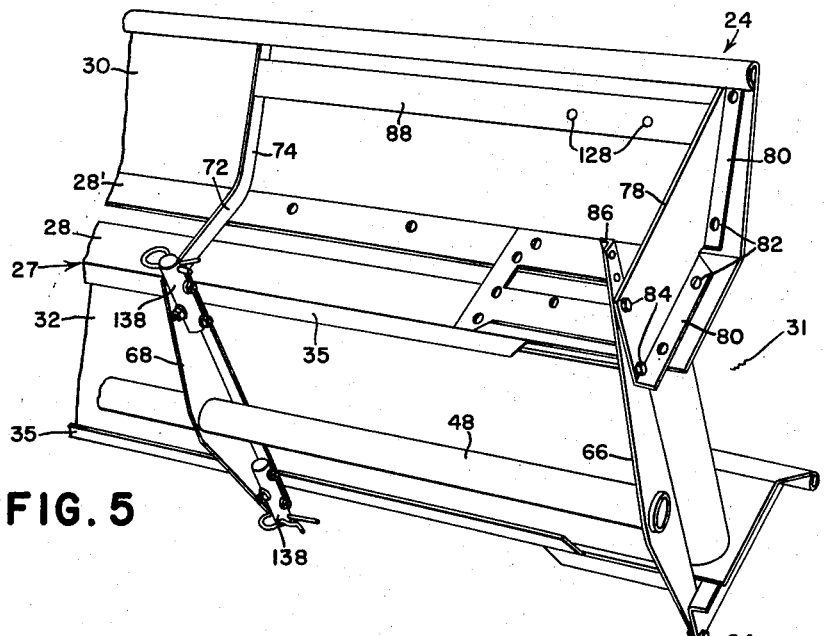
Fig. 5 is an enlarged fragmentary perspective of the housing-proximate portion of the feed table.

As previously described, the endmost cross member 66 is longer than the other cross members and its connection to the trough involves the use of a pair of upright plate members 78, shaped to conform to the trough sides and flares and rigidly secured thereto as by flanged portions 80 and fasteners 82 (Fig. 5). The plates are secured to opposite end portions of the cross member 66 by fasteners 84. The cross member 66 projects at one end as an integral extension 86, the purpose of which will be presently described. Each plate 78 is joined at its upper edge to the upper edge of the flared portion 74 of the next adjacent upright 72 by a fore-and-aft rigid member, here in the form of a channel 88, the connection being preferably effected by welding. These channels afford mounting means by means of which an improved pivotal mounting is provided for connecting the trough to the housing 10 for vertical swinging from its normal horizontal position as illustrated.

Figure 7:
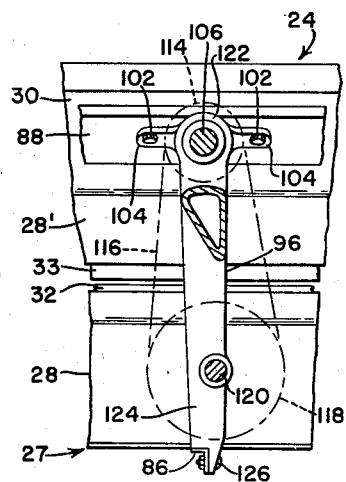
Fig. 7 is a section on the line 7—7 of Fig. 3.

The purpose of the pivotal means, as is conventional in machines of this type, is to enable raising of the trough so that a loaded wagon or vehicle may be driven past the position of the trough, after which the vehicle is stopped and the trough is lowered so that the contents of the vehicle may be dumped into the trough. The pivot means affords a pivot on a transverse horizontal axis and here comprises a pair of pivot mounts 90 and 92 and a pair of pivot brackets 94 and 96. The pivot bracket 94 is rigidly secured, as by bolts 98 (Fig. 3), to the pivot mount 90, and a short stub shaft 100 interconnects the mount and bracket 90 and 94 to afford the pivot at that side of the machine. The bolts 98 extend through the trough flare 30 and through the associated channel or bar 88, thus assuring a rigid mounting for the bracket 94. The same principle is embodied in the connection at the opposite side of the machine, wherein it will be seen that bolts 102 pass through the associated bar 88 and into apertured ears 104 on the pivot bracket 96 (Fig. 7). A shaft 106, coaxial with the stub shaft 100, completes this pivotal connection. This shaft serves additionally as a drive shaft in association with means for driving the conveyor belt 32. For this purpose, the pivot mount 92 is in the form of an enclosure for housing bevel gearing (not shown) the source of power for which is constituted by a fore-and-aft input shaft 108 driven by a belt 110 from the input for the entire machine, the details of which are largely conventional. The shaft 106 carries a clutch 112 which is selectively engageable with or disengageable from a driven member in the form of a sprocket 114.

A drive chain 116 is trained about the upper sprocket 114 and also about a lower or driven sprocket 118 which is keyed to a transverse shaft 120 for driving the front conveyor roller 34. As will be seen, the bracket 96 is a multi-function casting, the upper end of which is bifurcated at 122 to receive the pivot and drive shaft 106 and the lower end of which is in the form of a leg 124 that carries the lower shaft 120 and which depends further for removable connection at 126 to the extension 86 of the proximate cross member 66 (Figs. 3 and 7).

Visible at 128 in Fig. 5 are apertures for receiving the bolts 102 by means of which the pivot bracket 96 is secured to that side of the structure.

The clutch 112 is manually operative from either side of the machine by means of a cross shaft 130 having opposite hand levers 132 pivoted at 134 to associated sides of the machine, one end of the shaft 130 having an arm 136 connected to the clutch.

Figure 1:
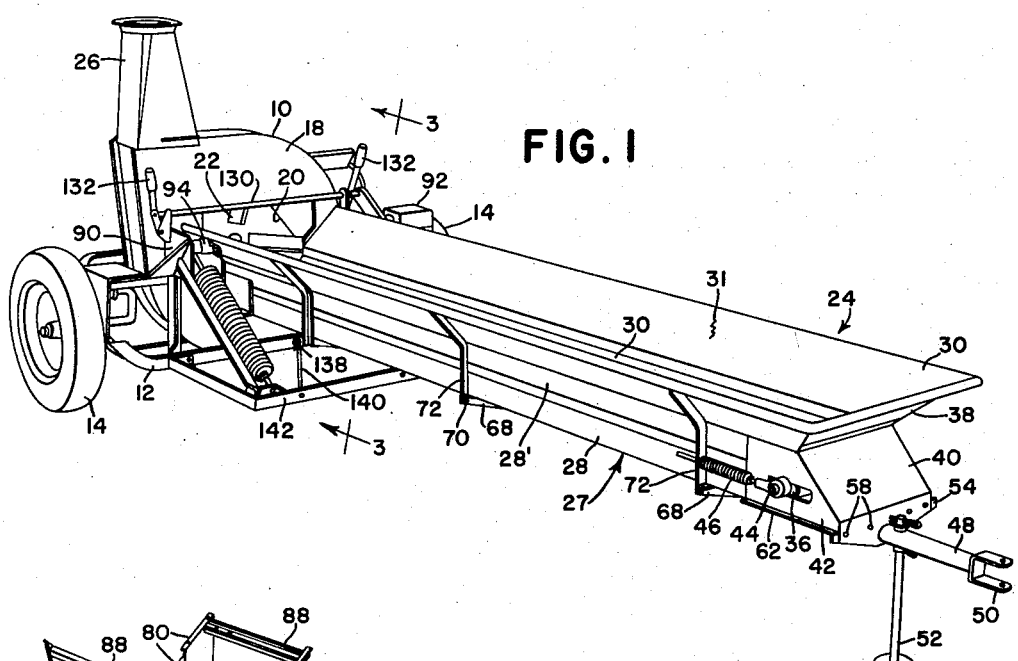
Fig. 1 is a perspective view of the entire machine.

In order that the machine may be securely tied down in its normal or horizontal position, the cross member 68 next adjacent to the elongated cross member 66 has rigidly secured at opposite ends thereto outwardly extending studs 138 (Figs. 1 and 5) to which hook members 140 are mounted for connection to a rear part 142 of the housing frame 12. When it is desired to elevate the conveyor trough 24, the hooks 140 are unhooked from the studs 138.

As will be seen from the foregoing, the backbone of the trough is the basic structure shown in Fig. 2, wherein the cross members 54, 66 and 68 are rigidly secured to tongue 48 and in turn disconnectibly carry the uprights 74 and 78. Not only is this an ideal structure for the machine when assembled, but the disconnectible fasteners enable ready shipment of the machine in a "knocked-down" condition. The rigid bars 88 that span the plates 78 and the next adjacent uprights 72 afford sturdy mountings for the brackets 94 and 96. The bracket 96 in addition to serving as part of the pivot means also carries part of the driving means, as already described. There is thus provided a simple and inexpensive structure following conventional lines so as to retain the operational characteristics already commercially established, and at the same time incorporating novel structure whereby the over-all machine is improved.

Features of the invention not categorically enumerated will undoubtedly occur to those versed in the art, as will many modifications and alterations in the preferred embodiment illustrated, all of which may be achieved without departure from the spirit and scope of the invention.

What is claimed is:

1. A feed table for a material-handling machine of the type having a housing provided with a material-receiving opening, said feed table comprising: an elongated trough structure extending from the housing and having a discharge end at and communicating with the material-receiving opening and having an opposite end remote from said opening and said trough having opposite sides; an elongated tongue below and running lengthwise of said structure substantially centrally between said sides from said discharge end to and beyond said remote end; a plurality of U-shaped elements spaced apart lengthwise of the tongue and respectively having bight portions transverse to and rigid on said tongue and leg portions extending upwardly alongside and rigidly secured to the sides of said structure.

2. The invention defined in claim 1, including: a pair of members parallel to the structure, one at each side of said structure, rigidly interconnecting the leg portions of the two U-shaped elements closest to the discharge end of said structure; and means connecting said structure at its discharge end to the housing for swinging of the structure relative to the housing about a generally horizontal axis transverse to the structure, said means including a pair of coaxial pivot brackets secured respectively to the aforesaid interconnecting members, a pair of pivot mounts on the housing, one adjacent to and coaxial with each bracket, and a pair of coaxial pivot shafts respectively connecting the brackets to the mounts.

3. The invention defined in claim 2, in which: the trough structure includes a conveyor running lengthwise thereof at a level below the pivot axis and includes a drivable part adjacent to said discharge end, and at least one of the pivot brackets includes a depending portion having a rotatable part coaxially connected to said drivable part.

4. The invention defined in claim 3, in which: the pivot shaft connecting said one pivot bracket to its associated pivot mount is rotatable and carries a driving member, the rotatable part carries a driven member, and drive means interconnects said driving and driven members.

5. The invention defined in claim 3, in which: the depending portion is rigidly secured to the proximate U-shaped element.

6. A feed table for a material-handling machine of the type having a housing provided with a material-receiving opening, said feed table comprising: an elongated trough structure extending from the housing and having a discharge end at and communicating with the material-receiving opening and having an opposite end remote from said opening and said trough having opposite sides; an elongated tongue below and running lengthwise of said structure substantially centrally between said sides from said discharge end to and beyond said remote end; a plurality of cross members rigidly secured to and spaced lengthwise of said tongue, each cross member having opposite end portions respectively proximate to the sides of the structure; a plurality of upstanding members rigidly secured to the cross member end portions and extending respectively upwardly alongside and rigidly secured to said sides, one cross member and its associated upstanding members being closely proximate to said discharge end and another cross member and its associated upstanding members being spaced from said discharge end; and additional members respectively extending between and rigidly interconnecting the above-mentioned upstanding members at said sides of the trough structure.

7. A feed table for a material-handling machine of the type having a housing provided with a material-receiving opening, said feed table comprising: an elongated trough structure extending from the housing and having a discharge end at and communicating with the material-receiving opening and having an opposite end remote from said opening and said trough having opposite sides; an elongated support below and running lengthwise of said structure substantially centrally between said sides from said discharge end to said remote end; a plurality of U-shaped elements spaced apart lengthwise of the support and respectively having bight portions transverse to and rigid on said support and leg portions extending upwardly alongside and rigidly secured to the sides of said structure.

References Cited in the file of this patent

UNITED STATES PATENTS

| | | |
|---|---|---|
| 984,155 | Preston | Feb. 14, 1911 |
| 1,928,859 | Kutscha | Oct. 3, 1933 |
| 2,124,246 | Ebell | July 19, 1938 |
| 2,139,834 | Levin | Dec. 13, 1938 |
| 2,385,451 | Krause et al. | Sept. 25, 1945 |
| 2,524,633 | Orjala | Oct. 3, 1950 |
| 2,584,288 | Przybylski | Feb. 5, 1952 |
| 2,842,256 | Reed | July 8, 1958 |